United States Patent [19]

Nakel et al.

[11] Patent Number: 4,551,342

[45] Date of Patent: Nov. 5, 1985

[54] BEVERAGES CONTAINING SPECIFIC CATION-EDIBLE ACID MIXTURES FOR IMPROVED FLAVOR IMPRESSION

[75] Inventors: Gunther M. Nakel, Aurora, Ind.; David C. Heckert, Oxford, Ohio

[73] Assignee: The Procter & Gamble Company, Cincinnati, Ohio

[21] Appl. No.: 544,310

[22] Filed: Oct. 21, 1983

Related U.S. Application Data

[63] Continuation-in-part of Ser. No. 462,734, Feb. 1, 1983, abandoned.

[51] Int. Cl.$^4$ .................. A23L 1/236; A23L 2/00; A23L 2/40
[52] U.S. Cl. .................................... 426/548; 426/590; 426/591; 426/650
[58] Field of Search ................. 426/590, 548, 74, 477, 426/591, 650

[56] References Cited

U.S. PATENT DOCUMENTS

| | | |
|---|---|---|
| 2,224,252 | 12/1940 | Callaway ........................ 426/590 |
| 2,297,599 | 9/1942 | Wilen . |
| 2,463,962 | 3/1949 | Gorcica et al. . |
| 2,851,359 | 9/1958 | Diller . |
| 2,851,360 | 9/1958 | Diller . |
| 2,851,361 | 9/1958 | Diller . |
| 2,868,646 | 1/1959 | Schapiro . |
| 2,953,459 | 9/1960 | Diller . |
| 2,984,543 | 5/1961 | Smith et al. . |
| 2,985,562 | 5/1961 | Millard et al. . |
| 3,114,641 | 12/1963 | Sperti et al. . |
| 3,649,298 | 3/1972 | Kreevoy et al. . |
| 3,657,424 | 4/1972 | Atkins et al. . |
| 3,660,107 | 5/1972 | Mayer . |
| 3,939,289 | 2/1976 | Hornyak et al. . |
| 3,965,273 | 6/1976 | Stahl . |
| 3,968,263 | 7/1976 | Reussner . |
| 4,127,645 | 11/1978 | Witzel et al. . |
| 4,322,407 | 3/1982 | Ko . |
| 4,325,975 | 4/1982 | Lindon et al. . |
| 4,423,029 | 12/1983 | Rizzi ................................ 424/54 |
| 4,448,770 | 5/1984 | Epting ........................... 424/153 |

FOREIGN PATENT DOCUMENTS

| | | |
|---|---|---|
| 504410 | 10/1979 | Australia . |
| 75114 | 3/1983 | European Pat. Off. . |
| 2405659 | 8/1975 | Fed. Rep. of Germany . |
| 54-8767 | 1/1979 | Japan . |
| 56-97248 | 8/1981 | Japan . |
| 58-128220 | 7/1983 | Japan . |
| 708411 | of 0000 | South Africa . |
| 883169 | 2/1961 | United Kingdom . |
| 2095530 | 10/1982 | United Kingdom . |

OTHER PUBLICATIONS

Nagy et al., *Citrus Science and Technology*, vol. 1, (1966 Ed. AVI Publishing Co.), pp. 208–228, 479–495.

Pangborn, "Relative Taste Intensities of Selected Sugars and Organic Acids," *J. Food Sci.*, vol. 28, (1963), pp. 726–733.

Beatty, "The Sourness of Acids," *J. Am. Chem. Soc.*, vol. 57, (1935), pp. 2347–2351.

*Primary Examiner*—Raymond Jones
*Assistant Examiner*—Elizabeth C. Weimar
*Attorney, Agent, or Firm*—Eric W. Guttag; Steven J. Goldstein; Richard C. Witte

[57] ABSTRACT

Beverages especially suitable for carbonated soft drinks having a pH of from about 2.5 to about 6.5 are disclosed herein. These beverages have a flavor component which contains flavors selected from fruit flavors, botanical flavors and mixtures thereof. These beverages also contain mixtures of calcium and potassium cations, and preferably mixtures of calcium, magnesium and potassium cations, defined by a regression formula. Also included are edible acids selected from citric, malic/-succinic and phosphoric acid, and mixtures thereof defined by a second regression formula. These beverages provide desirable flavor impressions in terms of sweetness, body and sourness with minimal bitter or salty off-notes. In addition, concentrates and syrups used to form these beverages have surprising stability against precipitation of insoluble salts.

32 Claims, 4 Drawing Figures

BEVERAGES CONTAINING SPECIFIC CATION-EDIBLE ACID MIXTURES FOR IMPROVED FLAVOR IMPRESSION

CROSS-REFERENCE TO RELATED APPLICATIONS

This application is a continuation-in-part of U.S. application Ser. No. 462,734, filed Feb. 1, 1983 now abandoned.

TECHNICAL FIELD

The present application relates to beverage compositions, in particular carbonated soft drinks.

One of the key characteristics of a beverage is the flavor impression it provides to the consumer. This is particularly true of carbonated beverages normally referred to as "soft drinks." Unlike drinking water, carbonated beverages provide a variety of flavor impressions. These flavor impressions are generated by natural flavor oils, flavor extracts and synthetically derived flavor materials. Different flavors are typically blended together to form a fuller, more complex flavor sensation.

Besides the particular flavor character of each flavor system, other factors can affect the overall flavor impression of a carbonated beverage. One which is important is the sweetness. Typically, sugar in the form of sucrose or high fructose corn syrup is added to carbonated beverages in order to impart the desired sweetness. For those who must restrict their intake of sugar, the beverage can be sweetened with non-nutritive (non-caloric) sweeteners such as saccharin, L-aspartyl-L-phenylalanine lower alkyl esters and the like. The sweetness intensity imparted by these sweeteners can affect not only the overall desirability of the carbonated beverage, but can also affect the flavor impression provided by the particular blend of flavors.

Another factor which is particularly important to the flavor impression of a beverage is its body. As used herein, "body" refers to the fullness, roundness and richness of the flavor impression generated. As such, body primarily defines the quality of the particular flavor balance, rather than its quantity, i.e. strength. Frequently, a beverage which has body also provides an apparent thickness texture effect, i.e. the tongue senses a perceived increase in viscosity unrelated to the instrumentally measured viscosity. By comparison, a beverage which lacks body is considered to be "watery" in flavor and texture.

Although body has usually been associated with coffee beverages, it has also been found to be very important to the flavor impression of carbonated beverages. Besides its sweetening effect, it has been found that sucrose imparts body to such beverages. For example, if the level of sucrose in a carbonated soft drink is decreased or removed entirely, the beverage can lack a fullness or richness of flavor. Such is particularly true of those carbonated soft drinks which are sweetened with non-caloric sweeteners. An increase in the sucrose level should likewise increase the body of a carbonated soft drink. However, too much sugar can significantly increase not only the caloric value of the beverage, but can also detract from the overall flavor impression. As such, the ability of sucrose to accent the body of a carbonated soft drink is significantly limited.

It has been found that body can be imparted to beverages, in particular carbonated beverages, through the use of mixtures of certain cations (calcium, magnesium, potassium) in combination with certain edible acids (citric, malic, phosphoric acid). The degree to which beverage body is delivered by these mixtures is believed to be related to the level at which the cations and acids are associated (complexed) in solution. However, this association normally leads to precipitation of insoluble salts (e.g. calcium citrate, calcium malate, etc.) at moderate concentrations of the cation-acid mixtures. In order to realize fully the body benefit of such cation-acid mixtures, control of this precipitation problem, together with control of the undesirable off-notes of the cations, is necessary.

Another factor which contributes to the flavor impression of carbonated soft drinks is sourness, especially for those soft drinks formulated with citrus flavors such as orange. Sourness is imparted to the beverage not only by free hydronium ions but also by the particular edible acids in the beverage. For citrus-type beverages, citric acid is the most commonly used edible acid. For cola-type beverages, phosphoric acid is the most commonly used edible acid. Depending upon the particular edible acid(s) used, the pH of carbonated beverages can vary greatly. The ability to control sourness over this pH range is very important if the desired flavorful impression is to be provided for all carbonated soft drinks, no matter what the particular flavor system is.

It is therefore an object of the present invention to provide a beverage, especially a carbonated beverage, which has improved overall flavor impression.

It is another object of the present invention to provide a beverage, especially a carbonated beverage, which has desirable sweetness intensity.

It is a further object of the present invention to provide a beverage, especially a carbonated beverage, having increased body, even at decreased sugar levels or with no sugar.

It is yet another object of the present invention to provide a carbonated beverage wherein the sourness can be controlled over a broad pH range.

It is still another object of the present invention to provide beverages, especially beverage concentrates and syrups, containing polyvalent cations which are stable against precipitation of salts for an extended period of time.

These and other objects of the present invention are hereinafter disclosed.

BACKGROUND ART

British Patent Specification No. 883,169 to Diller, published Nov. 22, 1961 describes a carbonated beverage powder containing carbonate salts and edible acids. The first form of this powder involves a mixture of calcium and potassium carbonate with citric acid which can provide a liquid beverage having a pH of preferably from 4.1–4.8. Other alkaline earth and alkali carbonates can be included in small amounts. Also, in addition to citric acid, phosphoric acid can be included, preferably in a derivative form such as hexosephosphoric acid or monocalcium phosphate. The second form of the powder (beverage pH of about 3.8) involves mixtures of sodium, potassium and ammonium carbonates or bicarbonates with hemisodium phosphate alone or in combination with orthophosphoric acid or citric acid. This British Patent Specification states that mixtures of the acids and the carbonates are preferred to increase both the rate of solution of the powder and the palatability of the beverage, i.e. so that no single ion is present in so great an amount that its presence dominates the flavor of the beverage. Example V discloses a carbonated beverage powder containing a mixture of calcium carbonate, potassium bicarbonate, citric acid and monocalcium phosphate. See also U.S. Pat. No. 2,851,361 to Diller, issued Sept. 9, 1958 (first form of powder disclosed); U.S. Pat. No. 2,851,359 to Diller, issued Sept. 9, 1958 (second form of powder disclosed); U.S. Pat. No. 2,851,360 to Diller, issued Sept. 9, 1958 (carbonated beverage powder containing calcium carbonate, citric acid and phosphoric acid); U.S. Pat. No. 2,953,459 to Diller, issued Sept. 20, 1960 (carbonated beverage powder or tablet containing calcium carbonate, potassium bicarbonate, mono-potassium phosphate and citric acid).

U.S. Pat. No. 3,939,289 to Hornyak et al., issued Feb. 17, 1976, discloses a dry carbonated beverage concentrate formed by co-grinding calcium carbonate with an anydrous, edible acid such as citric or malic acid. Mixtures of sodium, potassium and ammonium carbonate can be included for supplemental carbonation. This patent teaches that sodium, potassium and ammonium carbonates provide an undesirable taste in carbonated beverages which is improved by substitution of calcium carbonates or bicarbonates. See also U.S. Pat. No. 3,965,273 to Stahl, issued June 22, 1976, which discloses a similar dry carbonated beverage concentrate containing a solid suspension of finely-divided calcium carbonate dispersed within a matrix of a carbohydrate such as sugar.

U.S. Pat. No. 2,868,646 to Schapiro, issued Jan. 13, 1959, describes a sugar-acid crystal blend and a sugar-carbonate crystal blend which are made separately, mixed together and then coated to form a dry carbonated beverage concentrate. A mixture of edible acids such as citric, malic and phosphoric acid can be used. Sodium bicarbonate is the preferred bicarbonate although other non-toxic alkali metal and alkaline earth metal bicarbonates can be used instead. See also U.S. Pat. No. 3,985,562 to Millard et al. issued May 23, 1961, which discloses an effervescent tablet formed from a mixture of alkali metal carbonates or bicarbonates (e.g., sodium, potassium and calcium) with a mixture of edible acids such as citric and malic acid.

U.S. Pat. No. 4,322,407 to Ko, issued Mar. 30, 1982 discloses an electrolyte drink (pH preferably 6.8–7.4) containing various components in key ratios. The components include potassium ions, sodium ions, magnesium ions, phosphate ions and citrate ions. This patent states that the unpleasant taste of the electrolytes can be masked by balancing the relative ratios. See also U.S. Pat. No. 4,325,975 to Linden et al., issued Apr. 20, 1982, which discloses a mineralized drinking water free of sodium and potassium ions which contains strontium, magnesium, calcium and lithium ions.

Other carbonated tablets or powders, especially for beverages, are also disclosed in the art. U.S. Pat. No. 2,984,543 to Smith et al., issued May 16, 1961 (sodium, potassium, calcium or magnesium carbonates or bicarbonates in finely divided form impregnated with a hydrophilic gum and then admixed with an edible acid such as citric and/or malic acid); U.S. Pat. No. 2,463,962 to Gorcica et al., issued Mar. 8, 1949 (beverage carbonation composition containing a carbamino salt of calcium or magnesium and an edible acid such as citric and/or malic acid); U.S. Pat. No. 3,660,107 to Mayer, issued May 2, 1972 (carbonated beverage powder and tableted beverage composition containing a mixture of citric acid, tartaric acid, and sodium bicarbonate or potassium bicarbonate); U.S. Pat. No. 3,649,298 to Kreerey et al., issued Mar. 14, 1972 (dry carbonated beverage concentrate containing N-carboxy-amino acids, various carbonates and bicarbonates of alkali metal and alkaline earth metals such as sodium, potassium and calcium, and edible acids such as citric acid); U.S. Pat. No. 4,127,645 to Witzel et al., issued Nov. 28, 1978 (carbonated tablet containing alkali metal or alkaline earth metal carbonates and bicarbonates (e.g., sodium, potassium, magnesium and calcium), and edible acids such as citric and malic acid); South African Patent Application No. 708,411 to Rothe et al. (carbonated beverage tablet or powder containing alkali metal and/or alkaline earth metal carbonate and/or bicarbonate and edible acids such as citric or malic acid); U.S. Pat. No. 2,297,599 to Wilen, issued Sept. 29, 1942 (carbonated tablet containing a mixture of sodium, potassium and ammonium bromide plus monosodium citrate and sodium bicarbonate, or mixture of calcium gluconate, sodium and potassium bicarbonate, magnesium sulfate, sodium chloride, sodium bicarbonate, citric acid and tartaric acid). See also U.S. Pat. No. 3,968,263 to Reussner, issued July 6, 1976, which discloses a beverage mix for reducing tooth enamel demineralization which comprises an edible acid such as citric or malic acid, and tricalcium phosphate.

DISCLOSURE OF THE INVENTION

The present invention relates to beverage compositions especially suitable for carbonated soft drinks which maximize the delivery of body and unexpectedly minimize the precipitation of insoluble salts, even when prepared as beverage concentrates and syrups. These compositions provide liquid beverages having a pH of from about 2.5 to about 6.5 and have an effective amount of a flavor component which contains a flavor selected from fruit flavors, botanical flavors and mixtures thereof. These compositions also contain an effective amount of a cation component defined by the formula:

$$(8.0 \times Ca) + (7.1 \times Mg) + (7.0 \times K) + (3.0 \times Ca \times Mg) + (12.9 \times Ca \times K) + (11.5 \times Mg \times K) + (20.3 \times Ca \times Mg \times K) = B$$

wherein Ca is the weight ratio of calcium in the cation component, Mg is the weight ratio of magnesium, K is the weight ratio of potassium, and B is from about 10.0 to about 11.3. Also included is an effective amount of an edible acid component defined by the formula:

$$(8.7 \times cit) + (8.9 \times mal) + (11.4 \times phos) + (5.5 \times cit \times mal) - (0.6 \times cit \times phos) + (5.0 \times mal \times phos) + (30.1 \times cit \times mal \times phos) = A$$

wherein cit is the weight ratio of citric acid in the acid component, mal is the weight ratio of malic, succinic or a mixture of malic and succinic acid, phos is the weight ratio of phosphoric acid, and A is from about 9.6 to about 12.1.

The cation component which contains a mixture of key cations (calcium and potassium, or preferably calcium, magnesium and potassium) in combination with the acid component which contains key edible acids (citric acid, malic acid/succinic acid, and phosphoric acid), provide improved overall flavor impressions in liquid beverages, especially carbonated soft drinks. The specific cation-acid mixtures impart an improved sweetness perception to the beverage. In particular, the specific mixtures of cations-acids impart significantly increased body to the overall flavor and texture impression. Further, by appropriate balancing of the cation component relative to the acid component, the sourness of the beverage can be controlled over a broad pH range.

The specific cation-acid mixtures of the present invention achieve the above objects while avoiding several problems of prior art beverage tablets or powders which use cation carbonates (or bicarbonates) and edible acids to generate carbonated beverages. One of these problems is the off-notes imparted by some of the cations. For example, calcium can impart a chalky note, while potassium can impart a salty and bitter taste when used at too high a level. By using a selected mixture of these cations in conjunction with a selected mixture of edible acids, the effect of the individual off-notes is surprisingly attenuated even when high levels of cations such as potassium are used. Moreover, solubility problems occasioned by the formation of precipitates when some of the cations (especially calcium) are added to certain of the acids (especially citric acid) are unexpectedly minimized. By avoiding such solubility problems, the liquid beverage compositions of the present invention not only have improved flavor (e.g. no chalky note due to insoluble calcium salts), but can also be formulated into storage-stable concentrate and syrup forms. These stable concentrates and syrups can be subsequently mixed with water to form single-strength liquid beverages according to standard carbonated beverage industry practice.

A. FLAVOR COMPONENT

Figure 1:
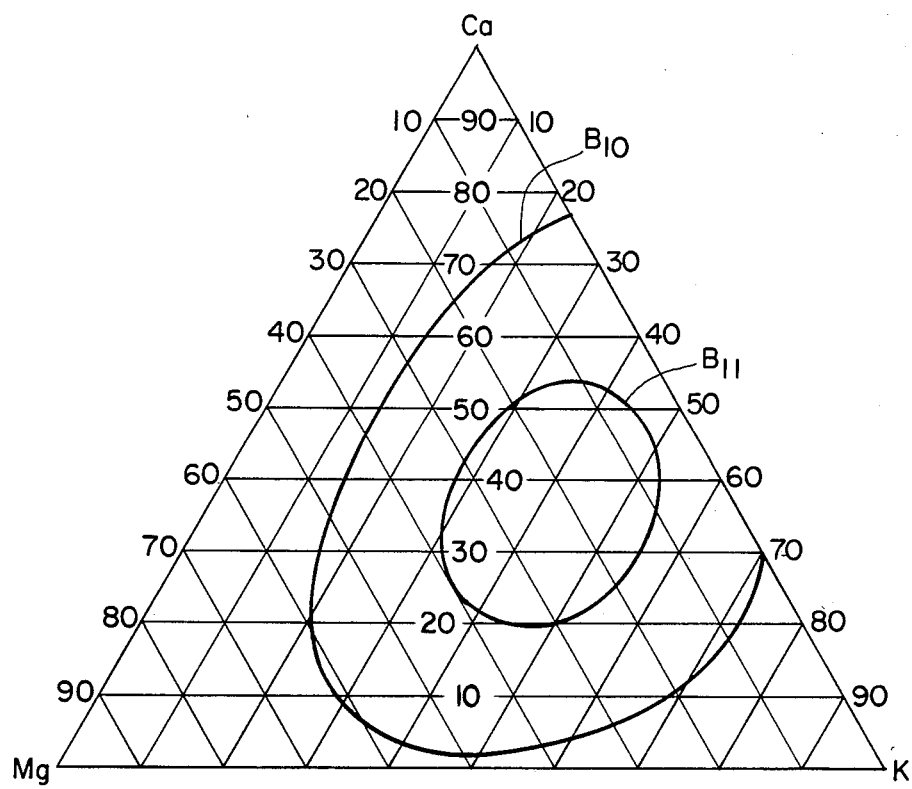
FIG. 1 represents a ternary diagram for the cation component.

The flavor component of the beverage compositions of the present invention contains a flavor selected from fruit flavors, botanical flavors and mixtures thereof. As used herein, the term "fruit flavor" refers to those flavors derived from the edible reproductive part of a seed plant, especially one having a sweet pulp associated with the seed. Also included within the term "fruit flavor" are synthetically prepared flavors made to simulate fruit flavors derived from natural sources. Particularly preferred fruit flavors are the citrus flavors including orange flavors, lemon flavors, lime flavors and grapefruit flavors. The present invention is particularly suitable in the formulation of beverages containing orange flavors. Besides citrus flavors, a variety of other fruit flavors can be used such as apple flavors, grape flavors, cherry flavors, pineapple flavors and the like. These fruit flavors can be derived from natural sources such as fruit juices and flavor oils, or else synthetically prepared.

As used herein, the term "botanical flavor" refers to flavors derived from parts of a plant other than the fruit. As such, botanical flavors can include those flavors derived from nuts, bark, roots and leaves. Also included within the term "botanical flavor" are synthetically prepared flavors made to simulate botanical flavors derived from natural sources. Examples of such flavors include kola flavors, tea flavors and the like. Kola flavors are particularly suitable in liquid beverages of the present invention. These botanical flavors can be derived from natural sources such as essential oils and extracts, or else can be synthetically prepared.

Usually, the flavor component comprises a blend of various flavors, e.g. lemon and lime flavors, kola flavors with citrus flavors to form cola flavors, etc. If desired, fruit juices such as orange juice, lemon juice, lime juice and the like can be used in the flavor component. For liquid beverages, the flavors in the flavor component are normally formed into emulsion droplets which are then dispersed in the beverage. Because these droplets usually have a specific gravity less than that of water and would therefore form a separate phase, weighting agents (which may also act as clouding agents) are typically used to keep the emulsion droplets dispersed in the beverage. Examples of such weighting agents are brominated vegetable oils (BVO) and rosin esters, in particular the ester gums. See L. F. Green, *Developments in Soft Drinks Technology*, Vol. 1, (Applied Science Publishers Ltd. 1978), pp. 87-93 (herein incorporated by reference), for a further description of the use of weighting and clouding agents in liquid beverages. Besides weighting agents, emulsifiers and emulsion stabilizers can be used to stabilize the emulsion droplets. Examples of such emulsifiers and emulsion stabilizers include the gums, pectins, celluloses, polysorbates, sorbitan esters and propylene glycol alginates. See L. F. Green, supra at p. 92.

The particular amount of the flavor component effective for imparting flavor characteristics to the beverage compositions of the present invention can depend upon the flavor(s) selected, the flavor impression desired, and the form of the flavor component. For concentrated flavors, the flavor component can comprise at least about 0.05% by weight of the beverage composition, and typically from about 0.1 to about 0.25% by weight for carbonated beverages. When fruit juices are used, the flavor component can comprise from about 5 to about 50% by weight of the beverage composition, and preferably from about 5 to about 10% by weight for carbonated beverages.

B. CATION COMPONENT, EDIBLE ACID COMPONENT AND PH

The cation component of the beverage compositions of the present invention comprises a mixture of calcium and potassium cations, and preferably a mixture of calcium, magnesium and potassium cations. These cations can be present, for example, as the respective carbonates, bicarbonates, hydroxides or sour salts, e.g. magnesium citrate. Other cations such as ammonium and sodium can also be optionally included in the cation component. However, because these cations impart less desirable ammonia and salty flavor notes, respectively, addition thereof should be at minimal levels or preferably not at all.

The cationic component of the present invention is graphically represented in FIG. 1 as a ternary diagram. Each apex of the ternary diagram represents a 1.00 weight ratio (100 weight percent) of the particular cation. Contour line $B_{10}$ encloses the area defining acceptable cation mixtures according to the present invention.

Contour line $B_{11}$ encloses the area defining preferred cation mixtures according to the present invention.

The edible acid component of the beverage compositions of the present invention comprises phosphoric acid, malic/citric acid or citric/phosphoric acid, or preferably a mixture of citric, malic and phosphoric acid. In the case of malic acid, succinic acid can be wholly or partly substituted therefor. These acids can be present in their undisassociated form or else as the respective sour salts, e.g. citrate, malate, dihydrogen phosphate, etc. If desired, other edible acids such as tartaric acid, fumaric acid, and the like can also be included in the acid component.

Figure 2:
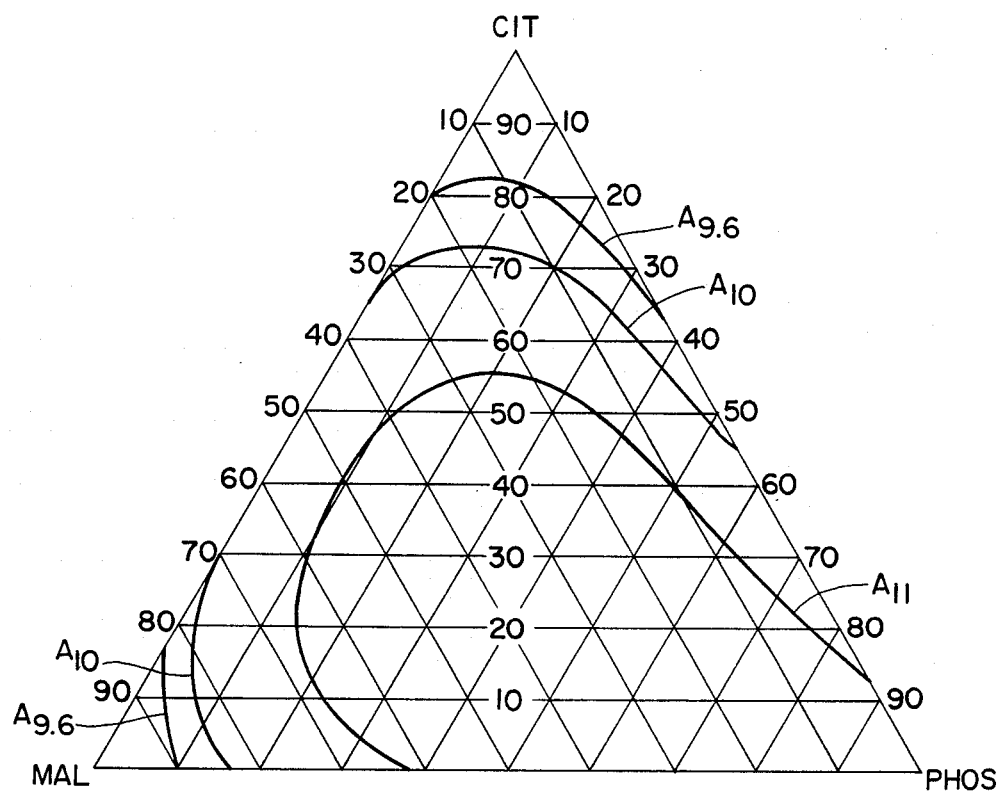
FIG. 2 represents a ternary diagram for the edible acid component.

The edible acid component is represented graphically in FIG. 2 by a ternary diagram. Each apex of this ternary diagram represents a 1.00 weight ratio (100 weight percent) of the particular acid. Contour line $A_{9.6}$ encloses the area defining acceptable acid components according to the present invention. Contour lines $A_{10}$ and $A_{11}$ enclose the areas defining preferred and most preferred acid components according to the present invention.

By using the ternary diagrams of FIGS. 1 and 2, suitable cation-acid mixtures for beverage compositions according to the present invention can be easily formulated. For example, a point can be selected within the area enclosed by contour line $B_{10}$ (or preferably $B_{11}$) and the relative percentage of each of the cations (calcium, magnesium, potassium) for this point can be read off from the ternary diagram. Similarly, a point can be selected within the area enclosed by contour line $A_{9.6}$ (or preferably $A_{10}$ or $A_{11}$) and the relative percentage of each of the acids (citric, malic (succinic), phosphoric) for this point can be read off from the ternary diagram. The combination of the two points selected give a suitable cation-acid mixture.

The ternary diagrams for the cation and acid components were developed by evaluating a number of attributes of liquid beverages containing different mixtures of these key cations and acids. These attributes were solubility, body, sweetness, sourness, bitterness, saltiness and off-notes. Solubility, body, sweetness and sourness are considered to be positive attributes; bitterness, saltiness and off-notes are considered to be negative attributes. Of the positive attributes, sweetness and body were determined to be the most important.

The solubility attribute was measured by determining the amount of solid material which precipitated from the liquid beverage (in concentrate form) over time. By contrast, the other six attributes were measured through organoleptic testing. In this testing, a panel of 15 expert tasters evaluated several sets of beverage samples containing 10 selected mixtures of cations (acid component held constant) and 10 selected mixtures of acids (cation component held constant). As a result of this testing, the expert panelists determined a rating of from 1 (low in attribute) to 9 (high in attribute) for each of the six attributes for each sample tested.

Figure 3:
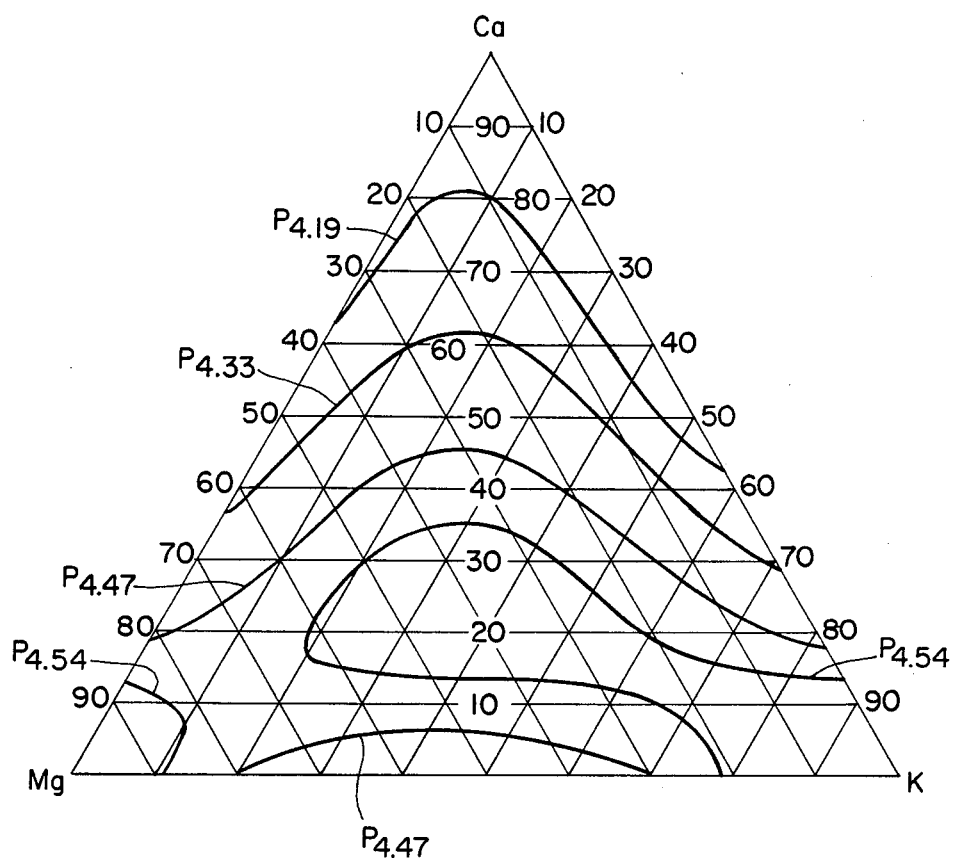
FIG. 3 represents an attribute ternary diagram for body.
Figure 4:
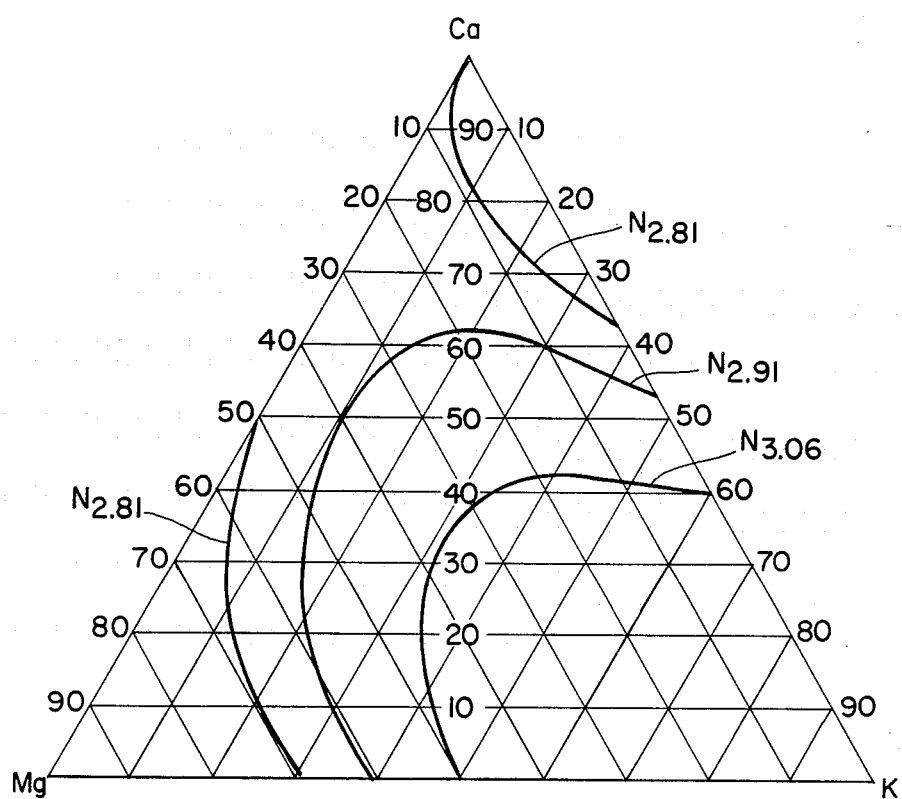
FIG. 4 represents an attribute ternary diagram for saltiness.

The results from measuring these seven attributes were then statistically evaluated. For each sample, the average ratings for each of the attributes were used to develop regression formulas. These regression formulas were used to plot contour lines on a ternary diagram for each attribute. One set of ternary diagrams was used to plot contour lines for each attribute where the cation mixture was varied; a similar procedure was used where the acid mixture was varied. Representative attribute ternary diagrams where the cation mixture was varied are shown in FIGS. 3 (body) and 4 (saltiness). As can be seen, the series of contour lines shown in these Figures enclose areas from low ($P_{4.19}$ and $N_{2.81}$) to high ($P_{4.54}$ and $N_{3.06}$) in the particular attribute. For body, a higher P value is more desirable. By contrast, a lower N value is more desirable for saltiness.

From the ternary diagrams for each of the attributes, several conclusions could be drawn. The weight ratio of acids was important for sweetness and sourness. Sweetness became less and sourness became more as the weight percentage of citric and malic acid increased; conversely, sweetness became more and sourness less as the weight percentage of phosphoric acid increased. Potassium contributed most to bitterness and saltiness; these off-notes were sharply reduced by increases in the amount of calcium and magnesium which also provide nutritional supplementation. The weight ratio of cations was important to perceived sweetness and body. Solubility was determined most by the relative percentage of citric acid and calcium.

These attribute ternary diagrams with the series of contour lines were made into transparencies, 7 in all for the cation component and the acid component, respectively. By overlaying these 7 transparencies on each other, an area of common preference was selected for both the cation and acid components. This area of common preference represents the area enclosed by contour line $B_{10}$ in FIG. 1 and the area enclosed by contour line $A_{9.6}$ in FIG. 2. The most preferred areas enclosed by contour lines $B_{11}$, $A_{10}$ and $A_{11}$ were also developed by using the overlaid transparencies.

The areas enclosed by the contour lines in FIGS. 1 and 2 can also be defined by regression formulas. Thus, the relative weight percent of the cations for the area enclosed by contour line $B_{10}$ is defined by the formula:

$$(8.0 \times Ca) + (7.1 \times Mg) + (7.0 \times K) + (3.0 \times Ca \times Mg) + (12.9 \times Ca \times K) + (11.5 \times Mg \times K) + (20.3 \times Ca \times Mg \times K) = B,$$

wherein Ca is the weight ratio of calcium in the cation component, Mg is the weight ratio of magnesium, K is the weight ratio of potassium, and B is from about 10.0 to about 11.3. For the preferred area enclosed by contour line $B_{11}$, B is from about 11.0 to about 11.3. Similarly, the relative weight percent of the edible acids for the area enclosed by contour line $A_{9.6}$ is defined by the formula:

$$(8.7 \times cit) + (8.9 \times mal) + (11.4 \times phos) + (5.5 \times cit \times mal) - (0.6 \times cit \times phos) + (5.0 \times mal \times phos) + (30.1 \times cit \times mal \times phos) = A,$$

wherein cit is the weight ratio of citric acid in the acid component, mal is the weight ratio of malic, succinic or a mixture of malic and succinic acid, phos is the weight ratio of phosphoric acid, and A is from about 9.6 to about 12.1. For the preferred, and most preferred, areas enclosed by contour lines $A_{10}$ and $A_{11}$, A is from about 10.0 to about 12.1, or from about 11.0 to about 12.1.

The cation and acid components are each present in an effective amount. What is an "effective amount" of the cation and acid components in beverage compositions of the present invention can depend on the particular flavor component used, the particular beverage formulation, the particular cation-acid mixture, and the effects desired. Usually, the cation component comprises at least about 0.03% by weight of the beverage composition, while the edible acid component comprises at least about 0.06% by weight of the beverage composition. For preferred liquid carbonated beverages, the cation component comprises from about 0.1 to about 0.6% by weight, while the edible acid component comprises from about 0.3 to about 1.2% by weight.

The pH of the liquid beverage depends most on the ratio of the cation component to the acid component, but can also be affected by the particular cation mixture and the particular acid mixture. For liquid beverages of the present invention, the pH can range from about 2.5 to about 6.5. Preferred liquid carbonated beverage compositions have a pH of from about 3.5 to about 4.8. The pH can be controlled primarily by adjusting the relative weight ratio of the cations to the acids; sourness can be controlled primarily by adjusting the concentration of the particular cation-acid mixture.

C. SWEETENERS

Beverage compositions of the present invention normally contain a sweetener. The sweetener typically used is sugar. As used herein, the term "sugar" refers to mono- and di-saccharide sweeteners. Examples of such sugars include sucrose, glucose, fructose (either pure or typically as a high fructose corn syrup), invert sugar and the like. Preferred sugars are sucrose and fructose in the form of a high fructose corn syrup.

For sugarless beverages, non-caloric sweeteners can be used. These sweeteners can be either derived from natural sources or else synthetically prepared. Examples of such sweeteners include saccharin, cyclamates, acetosulfam, sorbitol, xylitol, L-aspartyl-L-phenylalanine lower alkyl ester sweeteners, L-aspartyl-D-alanine alkyl amides disclosed in European Patent Application No. 34,876 to Pfizer, published Sept. 2, 1981 (herein incorporated by reference), L-aspartyl-L-1-hydroxymethylalkaneamide sweeteners disclosed in U.S. Pat. No. 4,338,346 to Brand, issued Dec. 21, 1982 (herein incorporated by reference), L-aspartyl-l-hydroxyethylalkaneamide sweeteners disclosed in U.S. application Ser. No. 277,307 to G. P. Rizzi, filed June 25, 1981 now U.S. Pat. No. 4,423,029, issued Dec. 27, 1983 (herein incorporated by reference), and the like. The cation-acid mixtures of the present invention are particularly suitable for increasing the body of liquid beverages containing such non-nutritive sweeteners or mixtures of these sweeteners with from about 1 to about 3% by weight sugar. In addition, the cation-acid mixtures of the present invention can provide improved hydrolytic stability for beverages containing L-aspartyl-L-phenyl-alanine ester (e.g. aspartame) sweeteners in the critical pH range of from about 4.0 to about 4.8.

The amount of the sweetener effective in the liquid beverage depends upon the particular sweetener(s) used and the sweetness intensity desired. For noncaloric sweeteners, this amount varies depending upon the sweetness intensity of the particular sweetener. For sugar, the amount of the sweetener can be from about 1 to about 14% (typically from about 6 to about 14%) by weight for a single-strength liquid carbonated beverage. Preferred single-strength beverages contain from about 9 to about 13% by weight sugar. For liquid beverage concentrates to which sugar is added (beverage syrups), the amount of sugar can be significantly higher. Usually, the amount of sugar in a beverage syrup is from about 30 to about 70% by weight. Preferably, such beverage syrups contain from about 40 to about 60% by weight sugar.

D. OTHER BEVERAGE INGREDIENTS

Other minor beverage ingredients are frequently included in beverages. Such ingredients include preservatives such as benzoic acid and salts thereof, sulfur dioxide, etc. Also typically included are colors derived either from natural sources or synthetically prepared. See L. F. Green, *Developments in Soft Drinks Technology*, Vol. 1 (Applied Science Publishers Ltd. 1978), pp. 185–186 (herein incorporated by reference) for preservatives and colors used in liquid beverages.

E. BEVERAGE PREPARATION

Beverage compositions of the present invention can be in the form of dry tablets or powders which can be added to water to form a liquid beverage. However, the present invention is particularly directed at beverage compositions which are already in liquid form. Liquid beverages of the present invention can be prepared by standard beverage formulation techniques. Although non-carbonated liquid beverages are within the scope of the present invention, particular emphasis is given to the making of carbonated beverages. It should be understood, however, that carbonated beverage making techniques, when appropriately modified, are also applicable to non-carbonated beverages.

In making a carbonated beverage, a beverage concentrate is usually formed containing from about 40 to about 70% by weight water. This beverage concentrate typically contains the emulsified flavor, emulsion stabilizing agents, weighting agents, any color desired and suitable preservatives. After the concentrate is formed, sugar (or other sweetener), the cation-acid mixture and water are then added to make a beverage syrup. This beverage syrup is then mixed with an appropriate quantity of water to form the final single-strength liquid beverage. The weight ratio of water:syrup is usually at least about 1:1, and preferably from about 3:1 to about 5:1. Carbon dioxide can be introduced either into the water mixed with the beverage syrup or into the single-strength beverage to achieve carbonation. The carbonated beverage can then be placed in a container such as a bottle or a can and then sealed. See L. F. Green, *Developments in Soft Drinks Technology*, Vol. 1, (Applied Science Publishers Ltd. 1978), pp. 102–107 (herein incorporated by reference), for a further description of beverage making, in particular the process for carbonation.

The amount of carbon dioxide introduced into the liquid beverage can depend upon the particular flavor system used and the amount of carbonation desired. Usually, carbonated beverages of the present invention contain from about 1.0 to about 4.5 volumes of carbon dioxide. Preferred carbonated beverages contain from about 2 to about 3.5 volumes of carbon dioxide.

SPECIFIC EMBODIMENTS OF LIQUID BEVERAGES AND METHODS FOR MAKING SAME ACCORDING TO THE PRESENT INVENTION

The following are specific embodiments of liquid beverages and methods for making same in accordance with the present invention:

EMBODIMENT 1

To 600 grams of distilled water were added 3.6 grams anhydrous citric acid, 1.2 grams malic acid and 1.4 grams of phosphoric acid (85%). While stirring, 0.4 grams calcium carbonate and 1.5 grams magnesium carbonate were added to this acid solution. After the solution had cleared, 2.2 grams potassium carbonate was added.

In a syrup consisting of 100 grams sucrose and 200 grams water, 0.001 grams yellow color, 2.0 grams orange flavor and 20 grams aqueous potassium benzoate (2.5%) solution were dissolved. This syrup was mixed with the previously prepared cation-acid solution, adjusted to 1000 grams by the addition of 68 grams of distilled water and then carbonated with 1.7 volumes of carbon dioxide to form a single-strength liquid beverage.

EMBODIMENT 2

In 800 grams of distilled water were dissolved or suspended, with stirring, 0.6 grams calcium hydroxide, 0.8 grams magnesium hydroxide and 1.0 grams potassium hydroxide, followed by 1.3 grams crystalline citric acid, 3.6 grams malic acid and 1.4 grams phosphoric acid (85%). After the solution had cleared, 0.002 grams yellow color, 2.0 grams orange flavor, 100 grams sucrose, 20 grams fructose, and 20 grams aqueous potassium benzoate (2.5%) solution were added. To this beverage syrup was added 49 grams of distilled water to form 1000 grams of a single-strength liquid beverage which was carbonated with from 1.7 to 2.2 volumes of carbon dioxide.

EMBODIMENT 3

To 800 grams of distilled water is added 4.0 grams magnesium citrate, 1.4 grams calcium hydrogen malate, 1.7 grams potassium dihydrogen phosphate and 1.0 grams potassium bicarbonate. After the solution clears, 0.002 grams yellow color, 2.0 grams orange flavor, 120 grams sucrose and 20 grams aqueous potassium benzoate (2.5%) solution are added. To this beverage syrup is added 50 grams of distilled water to form 1000 grams of a single-strength liquid beverage which is carbonated with about 2 volumes of carbon dioxide.

EMBODIMENT 4

In 768 grams of distilled water were dissolved or suspended with stirring, 2.3 grams calcium carbonate, 1.1 grams magnesium carbonate, and 2.6 grams potassium hydroxide. To this milky solution were added 2.4 grams anhydrous citric acid, 2.4 grams malic acid, and 8.5 grams aqueous phosphoric acid (85%). To this solution were then added 6.0 grams caramel color, 6.7 grams of a cola emulsion flavor, 0.3 grams of a cola blender, 0.1 grams aspartame, 160 grams sucrose, and 40 grams aqueous potassium benzoate (2.5%) solution. This beverage syrup (2-fold) was diluted with sufficient distilled water to form 2000 grams of a single-strength beverage which was carbonated with 4 volumes of carbon dioxide.

EMBODIMENT 5

To 600 grams of distilled water were added 0.6 grams anhydrous citric acid, 0.6 grams malic acid, and 2.1 grams phosphoric acid (85%). While stirring, 0.9 grams calcium carbonate and 0.5 grams magnesium carbonate were added. After this solution had cleared, 1.5 grams potassium bicarbonate was added.

In a syrup consisting of 140 grams sucrose and 200 grams water were dissolved 2.6 grams caramel color, 3.3 grams of a cola emulsion flavor, 0.2 grams of a cola blender and 20 grams aqueous potassium benzoate (2.5%) solution. This syrup was combined with the cation-acid solution, and then 27 grams of distilled water was added to provide 1000 grams of a single-strength liquid beverage which was carbonated with 4 volumes of carbon dioxide.

EMBODIMENT 6

In 800 grams of distilled water were dissolved or suspended, 0.5 grams calcium carbonate, 2.3 grams magnesium carbonate, 3.3 grams potassium bicarbonate, followed by 5.4 grams anhydrous citric acid, 1.8 grams malic acid, and 2.1 grams phosphoric acid (85%). After the solution had cleared, 0.001 grams yellow color, 2.0 grams orange flavor, 140 grams sucrose, and 20 grams aqueous potassium benzoate (2.5%) solution were added. To this beverage syrup were added 23 grams of distilled water to make a 1000 gram single-strength liquid beverage which was carbonated with 2 volumes of carbon dioxide.

EMBODIMENT 7

To 800 grams of distilled water were added, with stirring, 1.0 grams calcium carbonate, 1.4 grams magnesium carbonate, and 1.0 grams potassium bicarbonate, followed by 2.0 grams anhydrous citric acid, 2.0 grams malic acid, and 2.4 grams phosphoric acid (85%). After the solution had cleared, 0.006 grams yellow color, 2.0 grams orange flavor, 80 grams sucrose, and 20 grams aqueous potassium benzoate (2.5%) solution were added. To this beverage syrup was added 88 grams of distilled water to provide 1000 grams of a single-strength liquid beverage which was carbonated with 1.8 volumes of carbon dioxide.

EMBODIMENT 8

In 535 grams of distilled water were dissolved or suspended, with stirring, 4.5 grams calcium carbonate, 2.1 grams magnesium carbonate, and 5.2 grams potassium hydroxide. To this milky solution was added 4.8 grams anhydrous citric acid, 4.8 grams malic acid, and 17 grams phosphoric acid (85%). To this cation-acid solution were added 12 grams caramel color, 13 grams of a cola emulsion flavor, 0.7 grams of a cola blender, 0.2 grams Aspartame®, 320 grams sucrose, and 80 grams of aqueous potassium benzoate (2.5%) solution. This beverage syrup (four-fold) was diluted with sufficient water to provide 4000 grams of a single-strength beverage which was carbonated with 4 volumes of carbon dioxide.

EMBODIMENT 9

To 600 grams of distilled water were added 4.3 grams of citric acid monohydrate, 0.7 grams of malic acid and 0.4 grams of phosphoric acid (85%). While stirring, 0.5 grams of calcium carbonate and 0.9 grams of magnesium carbonate were added to this acid solution. After the solution had cleared, 1.4 grams of potassium carbonate was added.

In 300 grams of distilled water were dissolved 0.5 grams of aspartame, 0.25 grams of sodium benzoate, 0.001 grams of orange color, and 2.0 grams of an orange flavor emulsion. This solution was mixed with the previously prepared cation-acid solution, adjusted to 1000 grams by the addition of 87.6 grams of water, and carbonated with 2.5 volumes of carbon dioxide to form a single-strength beverage.

For Embodiments 1-9, the total amount of cations/acids in the beverage, the weight ratios of the Ca/Mg/K and cit/mal/phos components, the B (cation) and A (acid) values from the regression formulas, and the pH are shown in the following Table:

| Embod. | Cation/acid amount (%) | Ca/Mg/K (%) | B | cit/mal/ phos (%) | A | pH |
|---|---|---|---|---|---|---|
| 1 | 0.14/0.6 | 10/30/60 | 10.4 | 60/20/20 | 10.8 | 4.3 |
| 2 | 0.14/0.6 | 25/25/50 | 11.1 | 20/60/20 | 11.3 | 3.6 |
| 3 | 0.14/0.6 | 10/30/60 | 10.4 | 60/20/20 | 10.8 | 4.3 |
| 4 | 0.15/0.6 | 30/10/60 | 10.8 | 20/20/60 | 11.8 | 3.8 |
| 5 | 0.11/0.3 | 34/14/52 | 11.1 | 20/20/60 | 11.8 | 6.3 |
| 6 | 0.22/0.9 | 10/30/60 | 10.4 | 60/20/20 | 10.8 | 4.3 |
| 7 | 0.12/0.6 | 33/33/34 | 11.2 | 33/33/34 | 11.9 | 4.2 |
| 8 | 0.15/0.6 | 30/10/60 | 10.8 | 20/20/60 | 11.8 | 3.7 |
| 9 | 0.10/0.5 | 21/25/54 | 11.0 | 79/15/6 | 9.8 | 4.2 |

What is claimed is:

1. A composition for preparing a liquid beverage having a pH of from about 2.5 to about 6.5, which comprises:
   (a) a flavor component which contains a flavor selected from the group consisting of fruit flavors, botanical flavors and mixtures thereof in an amount effective to impart flavor characteristics to the prepared liquid beverage;
   (b) a cation component defined by the formula:

$$(8.0 \times Ca) + (7.1 \times Mg) + (7.0 \times K) + (3.0 \times Ca \times Mg) + (12.9 \times Ca \times K) + (11.5 \times Mg \times K) + (20.3 \times Ca \times Mg \times K) = B,$$

wherein Ca is the weight ratio of calcium in said cation component, Mg is the weight ratio of magnesium in said cation component, and K is the weight ratio of potassium in said cation component, and B is from about 10.0 to about 11.3; and
   (c) an edible acid component defined by the formula:

$$(8.7 \times cit) + (8.9 \times mal) + (11.4 \times phos) + (5.5 \times cit \times mal) - (0.6 \times cit \times phos) + (5.0 \times mal \times phos) + (30.1 \times cit \times mal \times phos) = A,$$

wherein cit is the weight ratio of citric acid in said acid component, mal is the weight ratio of malic, succinic, or a mixture of malic and succinic acid in said acid component, phos is the weight ratio of phosphoric acid in said acid component, and A is from about 9.6 to about 12.1;
   (d) said cation and acid components being in amounts effective to impart body to the prepared liquid beverage.

2. A composition according to claim 1 which is a liquid concentrate.

3. A composition according to claim 2 which further comprises sugar in an amount of from about 30 to about 70% by weight of the composition.

4. A composition according to claim 3 wherein said sugar comprises from about 40 to about 60% by weight of the composition.

5. A composition according to claim 2 which further comprises a non-caloric sweetener.

6. A composition according to claim 5 wherein said non-caloric sweetener is selected from the group consisting of L-aspartyl-L-phenylalanine lower alkyl ester sweeteners, L-aspartyl-D-alanine alkyl amide sweeteners, L-aspartyl-L-1-hydroxymethyl-alkaneamide sweeteners and L-aspartyl-1-hydroxyethylalkaneamide sweeteners.

7. A composition according to claim 2 wherein said cation component comprises at least about 0.03% by weight of the composition and wherein said acid component comprises at least about 0.06% by weight of the composition.

8. A composition according to claim 7 wherein said flavor is a citrus flavor.

9. A composition according to claim 8 wherein said citrus flavor is an orange flavor.

10. A composition according to claim 7 wherein said flavor is a cola flavor.

11. A composition according to claim 7 wherein B is from about 11.0 to about 11.3 and A is from about 11.0 to about 12.1.

12. A composition according to claim 7 wherein said cation component comprises from about 0.1 to about 0.6% by weight of the composition and wherein said acid component comprises from about 0.3 to about 1.2% by weight of the composition.

13. A composition according to claim 2 which comprises from about 40 to about 70% water by weight of the composition.

14. A liquid beverage having a pH of from about 2.5 to about 6.5, which comprises:
   (a) a flavor component which contains a flavor selected from the group consisting of fruit flavors, botanical flavors and mixtures thereof in an amount effective to impart flavor characteristics to the beverage;
   (b) a cation component defined by the formula:

$$(8.0 \times Ca) + (7.1 \times Mg) + (7.0 \times K) + (3.0 \times Ca \times Mg) + (12.9 \times Ca \times K) + (11.5 \times Mg \times K) + (20.3 \times Ca \times Mg \times K) = B$$

wherein Ca is the weight ratio of calcium in said cation component, Mg is the weight ratio of magnesium in said cation component, K is the weight ratio of potassium in said cation component, and B is from about 10.0 to about 11.3;
   (c) an edible acid component defined by the formula:

$$(8.7 \times cit) + (8.9 \times mal) + (11.4 \times phos) + (5.5 \times cit \times mal) - (0.6 \times cit \times phos) + (5.0 \times mal \times phos) + (30.1 \times cit \times mal \times phos) = A$$

wherein cit is the weight ratio of citric acid in said acid component, mal is the weight ratio of malic, succinic, or a mixture of malic and succinic acid in said acid component, phos is the weight ratio of phosphoric acid in said acid component, and A is from about 9.6 to about 12.1;
   (d) said cation and acid components being in amounts effective to impart body to the beverage; and
   (e) an effective amount of a sweetener.

15. A beverage according to claim 14, wherein said cation component comprises at least about 0.03% by weight of the beverage and wherein said acid component comprises at least about 0.06% by weight of the beverage.

16. A carbonated beverage according to claim 15 which contains from about 1.0 to about 4.5 volumes of carbon dioxide.

17. A beverage according to claim 15 wherein said flavor component comprises fruit juice in an amount of from about 5 to about 50% by weight of the beverage composition.

18. A carbonated beverage according to claim 16 which contains from about 2 to about 3.5 volumes of carbon dioxide.

19. A sealed container which has therein the carbonated beverage according to claim 18.

20. A carbonated beverage according to claim 18 wherein said cation component comprises from about 0.1 to about 0.6% by weight of the beverage and wherein said acid component comprises from about 0.3 to about 1.2% by weight of the beverage.

21. A carbonated beverage according to claim 20 wherein said sweetener comprises sugar.

22. A carbonated beverage according to claim 21 wherein said sugar comprises from about 6 to about 14% by weight of the beverage.

23. A carbonated beverage according to claim 22 wherein said sugar comprises from about 9 to about 13% by weight of the beverage.

24. A carbonated beverage according to claim 20 wherein said flavor is a citrus flavor.

25. A carbonated beverage according to claim 24 wherein said citrus flavor is an orange flavor.

26. A carbonated beverage according to claim 25 wherein said flavor component comprises orange juice in an amount of from about 5 to about 10% by weight of the beverage.

27. A carbonated beverage according to claim 20 wherein said sweetener comprises an effective amount of an L-aspartyl-L-phenylalanine lower alkyl ester sweetener and sugar in amount of from about 1 to about 3% by weight of the beverage, and wherein said pH is from about 4.0 to about 4.8.

28. A beverage according to claim 20 wherein said flavor is a cola flavor.

29. A carbonated beverage according to claim 20 wherein said sweetener comprises a non-caloric sweetener.

30. A carbonated beverage according to claim 24 wherein said non-caloric sweetener is selected from the group consisting of L-aspartyl-L-phenylalanine lower alkyl ester sweeteners, L-aspartyl-D-alanine alkyl amide sweeteners. L-aspartyl-L-1-hydroxymethylalkaneamide sweeteners and L-aspartyl-L-1-hydroxyethylalkaneamide sweeteners.

31. A carbonated beverage according to claim 20 wherein B is from about 11.0 to about 11.3 and A is from about 11.0 to about 12.1.

32. A carbonated beverage according to claim 20 wherein said pH is from about 3.5 to about 4.8.

* * * * *